US010444721B2

(12) United States Patent
Koyama et al.

(10) Patent No.: US 10,444,721 B2
(45) Date of Patent: Oct. 15, 2019

(54) SIMULATION APPARATUS, PROGRAM GENERATING DEVICE, CONTROLLER, AND DISPLAY METHOD FOR COMPUTER (71) Applicant: FANUC CORPORATION, Yamanashi (JP)

(72) Inventors: Yasuaki Koyama, Yamanashi-ken (JP); Kouji Satou, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 19 days.

(21) Appl. No.: 15/941,342

(22) Filed: Mar. 30, 2018

(65) Prior Publication Data
US 2018/0284711 A1    Oct. 4, 2018

(30) Foreign Application Priority Data

Apr. 3, 2017 (JP) ................. 2017-073676

(51) Int. Cl.
*G05B 19/042*    (2006.01)
*G05B 19/4069*    (2006.01)

(52) U.S. Cl.
CPC ..... *G05B 19/0426* (2013.01); *G05B 19/4069* (2013.01); *G05B 2219/23008* (2013.01); *G05B 2219/23456* (2013.01)

(58) Field of Classification Search
None
See application file for complete search history.

(56) References Cited

U.S. PATENT DOCUMENTS 5,406,494 A * 4/1995 Schuett .................. G05B 19/41
 318/569
5,493,502 A * 2/1996 Niwa ....................... G06N 7/04
 700/188

(Continued)

FOREIGN PATENT DOCUMENTS

JP    5123938 A    5/1993
JP    10293605 A    11/1998

(Continued)

OTHER PUBLICATIONS

Untranslated Decision to Grant a Patent mailed by Japan Patent Office (JPO) for Application No. JP 2017-073676, dated Feb. 19, 2019, 3 pgs.

(Continued)

*Primary Examiner* — Ramesh B Patel
(74) *Attorney, Agent, or Firm* — Fredrikson & Byron, P.A.

(57) ABSTRACT

A simulation apparatus includes an estimated spindle output computation unit configured to estimate, on the basis of cutting conditions, a rotational speed of the spindle and an output of the spindle at the time of cutting a workpiece, a cutting conditions display control unit configured to display the cutting conditions on a display unit, and an estimated spindle output display control unit configured to display on the display unit a graph showing a rated output with respect to rotational speed of the spindle, together with displaying on the display unit, as a coordinate point on the graph, a value related to the output with respect to rotational speed of the spindle which is estimated from the cutting conditions.

11 Claims, 6 Drawing Sheets

(56) References Cited

U.S. PATENT DOCUMENTS

| | | | | |
|---|---|---|---|---|
| 6,157,869 | A * | 12/2000 | Matsumura | G05B 19/4069 700/169 |
| 8,899,135 | B2 * | 12/2014 | Frank | B23B 29/03403 408/13 |
| 9,486,888 | B2 * | 11/2016 | Morita | B23Q 5/12 |
| 10,108,178 | B2 * | 10/2018 | Yasukochi | G05B 19/4069 |
| 2003/0204279 | A1 * | 10/2003 | Yokohari | G05B 19/4097 700/98 |
| 2014/0025192 | A1 * | 1/2014 | Seya | G05B 19/4063 700/174 |
| 2014/0180465 | A1 * | 6/2014 | Nakano | G05B 19/4097 700/160 |
| 2014/0288692 | A1 * | 9/2014 | Kawashima | G05B 19/40937 700/160 |
| 2014/0338468 | A1 * | 11/2014 | Ogawa | B23Q 17/0957 73/862.041 |
| 2015/0066213 | A1 * | 3/2015 | Morita | B23Q 5/12 700/275 |
| 2015/0253760 | A1 * | 9/2015 | Tateno | G06F 8/355 700/83 |
| 2016/0001410 | A1 * | 1/2016 | Koyama | B23Q 11/0007 700/170 |
| 2016/0054724 | A1 * | 2/2016 | Oda | G05B 19/4093 700/109 |
| 2017/0185064 | A1 * | 6/2017 | Masumiya | G05B 19/27 |
| 2018/0121578 | A1 * | 5/2018 | Atohira | G06F 17/5009 |

FOREIGN PATENT DOCUMENTS

| | | |
|---|---|---|
| JP | 20015507 A | 1/2001 |
| JP | 2010102416 A | 5/2010 |
| JP | 2012155473 A | 8/2012 |
| JP | 201547016 A | 3/2015 |
| JP | 201640659 A | 3/2016 |

OTHER PUBLICATIONS

English Machine Translation of Decision to Grant a Patent mailed by Japan Patent Office (JPO) for Application No. JP 2017-073676, dated Feb. 19, 2019, 3 pgs.

Untranslated Notification of Reasons for Refusal mailed by Japan Patent Office (JPO) for Application No. JP 2017-073676, dated Nov. 6, 2018, 4 pgs.

English Machine Translation of Notification of Reasons for Refusal mailed by Japan Patent Office (JPO) for Application No. JP 2017-073676, dated Nov. 6, 2018, 3 pgs.

English Abstract and Machine Translation for Japanese Publication No. 10-293605 A, published Nov. 4, 1998, 10 pgs.

English Abstract and Machine Translation for Japanese Publication No. 2010-102416 A, published May 6, 2010, 17 pgs.

English Abstract and Machine Translation for Japanese Publication No. 2016-040659 A, published Mar. 24, 2016, 12 pgs.

English Abstract and Machine Translation for Japanese Publication No. 2001-005507 A, published Jan. 12, 2001, 14 pgs.

English Abstract and Machine Translation for Japanese Publication No. 05-123938 A, published May 21, 1993, 8 pgs.

English Abstract for Japanese Publication No. 2015047016 A, published Mar. 12, 2015, 1 pg.

English Abstract and Machine Translation for Japanese Publication No. 2012-155473, published Aug. 16, 2012, 10 pgs.

* cited by examiner

SIMULATION APPARATUS, PROGRAM GENERATING DEVICE, CONTROLLER, AND DISPLAY METHOD FOR COMPUTER

CROSS-REFERENCE TO RELATED APPLICATION

This application is based upon and claims the benefit of priority from Japanese Patent Application No. 2017-073676 filed on Apr. 3, 2017, the contents of which are incorporated herein by reference.

BACKGROUND OF THE INVENTION

Field of the Invention

The present invention relates to a simulation apparatus, a program generating device, a controller, and a display method for a computer, by which a value related to an output of a spindle is estimated from cutting conditions, and the value is displayed on a display unit.

Description of the Related Art

In Japanese Laid-Open Patent Publication No. 2012-155473, it is disclosed that power diagrams providing machine specification values are displayed on a display unit as a graph of output values of a spindle motor with respect to rotational speed of the spindle, and in such a graph, a line is shown indicating a required power of the spindle and a variation width of the rotational speed of the spindle. Further, the cutting conditions are automatically changed in a manner so that the line indicating the required power of the spindle and the variation width of the spindle rotational speed does not extend over the power diagrams.

SUMMARY OF THE INVENTION

In Japanese Laid-Open Patent Publication No. 2012-155473, since only a graph is displayed in which there are shown the power diagrams, and the line indicating the required power of the spindle and the variation width of the spindle rotational speed, it is impossible for an operator to confirm the cutting conditions that are set.

The present invention has been devised with the aim of solving the aforementioned problem, and has the object of providing a simulation apparatus, a program generating device, a controller, and a display method for a computer, in which it is possible for an operator to easily confirm the set cutting conditions.

An aspect of the present invention is characterized by including a characteristics storage unit configured to store a rated value of a value related to output of a spindle of a machine tool depending on a rotational speed of the spindle, a cutting conditions storage unit configured to store cutting conditions for cutting a workpiece, a spindle output estimating unit configured to estimate, on the basis of the stored cutting conditions, the rotational speed of the spindle, and the value related to the output of the spindle at the time of cutting the workpiece, a cutting conditions display control unit configured to display the stored cutting conditions on a display unit, and a spindle output display control unit configured to display on the display unit a graph showing the rated value with respect to the rotational speed of the spindle, and also display on the display unit, as a coordinate point on the graph, the value related to the output with respect to the rotational speed of the spindle which is estimated from the cutting conditions.

According to the present invention, it is possible for an operator to easily confirm the set cutting conditions.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

The present invention will be described below through various embodiments of the present invention. The illustrative embodiments are not intended to limit the present invention as defined in the appended claims. Furthermore, all of the combinations of features discussed in the illustrative embodiments might not be absolutely necessary for achieving the inventive solution.

First Embodiment

[Display of Display Unit of Simulation Apparatus]

Figure 1:
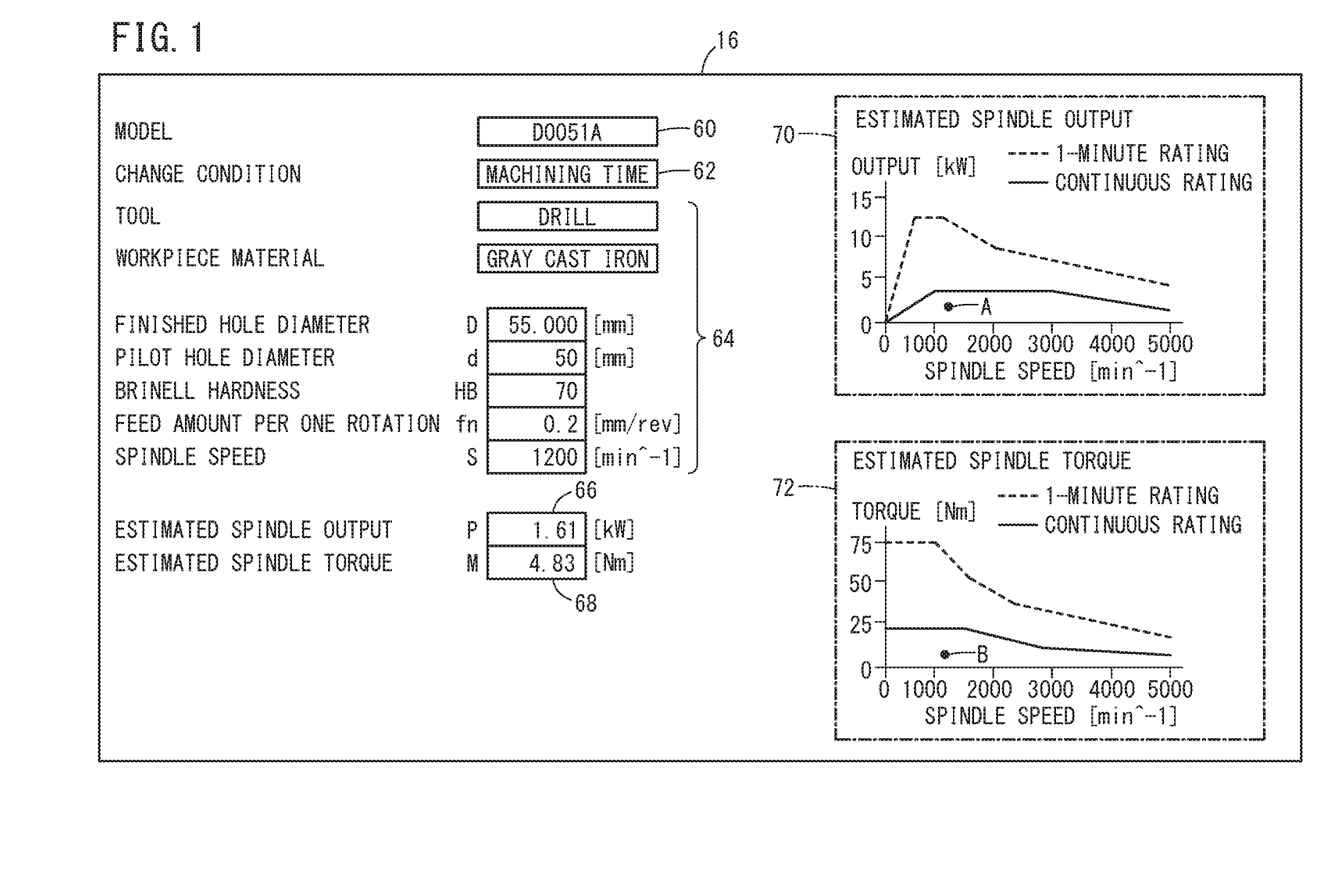
FIG. 1 is a diagram showing a display shown on a display unit of a simulation apparatus.

FIG. 1 is a diagram showing a display shown on a display unit 16 of a simulation apparatus 10. In the simulation apparatus 10 according to the present embodiment, an output and a torque of a motor that drives a spindle of a non-illustrated machine tool are estimated from set cutting conditions. In addition, the simulation apparatus 10 displays on the display unit 16 the set cutting conditions, the estimated output and torque, and a rated output and a rated torque of the motor.

By confirming the display on the display unit 16, an operator can recognize, for example, that the estimated output is less than the rated output, and that the estimated torque is less than the rated torque, and thus it can be determined that the workpiece can be machined with the set cutting conditions. On the other hand, by confirming the display on the display unit 16, the operator can recognize, for example, that the estimated output is greater than or equal to the rated output, and thus it can be determined that the workpiece cannot be machined with the set cutting conditions. In this case, the operator can set appropriate cutting conditions by modifying the existing cutting conditions while observing the display on the display unit 16. Hereinafter, the output and the torque of the motor that drives the spindle will be referred to as a spindle output and a spindle torque.

With reference to FIG. 1, a description will be given of the items that are displayed on the display unit 16. On the display unit 16, there are included a model setting field 60, a change condition setting field 62, a cutting conditions setting field 64, an estimated spindle output display section 66, an estimated spindle torque display section 68, an estimated spindle output graph display section 70, and an estimated spindle torque graph display section 72.

The model setting field 60 includes a pull-down list in which there are noted the model names of a plurality of machine tools. From the pull-down list, the operator selects a model of the machine tool for which the spindle output and the spindle torque are to be estimated. The change condition setting field 62 includes a pull-down list in which there are noted the item names of a plurality of change conditions. The operator selects a given change condition item from the pull-down list. The change conditions will be described in detail later.

In the cutting conditions setting field 64, a setting field is provided for each of the cutting condition items. The operator inputs a cutting condition in the setting field for each of such items. Although the cutting condition items differ depending on the type of cutting tool, in the case of FIG. 1, in which the type of cutting tool is a drill, more specifically, the cutting condition items include the type of the cutting tool, the material of the workpiece, a finished diameter of a hole to be machined in the workpiece, a pilot hole diameter, a Brinell hardness of the workpiece, a feed amount per one rotation of the spindle, and the spindle speed (spindle rotational speed). Although not shown in FIG. 1, in the case that the type of cutting tool is an end mill, the cutting condition items include the type of the cutting tool, the material of the workpiece, a cutting feed rate, a cutting depth in the axial direction, a cutting width in the radial direction, the number of blades of the end mill, and the spindle speed.

The estimated spindle output display section 66 displays an estimated spindle output, which is calculated from the set model of machine tool, and the set cutting conditions. The estimated spindle torque display section 68 displays an estimated spindle torque, which is calculated from the set model of machine tool, and the set cutting conditions.

The estimated spindle output graph display section 70 displays in the form of a graph a rated output (1-minute rating, continuous rating) with respect to a spindle speed for the model of machine tool that was set. Further, the estimated spindle output graph display section 70 displays as a coordinate point A on the graph an estimated spindle output with respect to the spindle speed.

The estimated spindle torque graph display section 72 displays in the form of a graph a rated torque (1-minute rating, continuous rating) with respect to a spindle speed for the model of machine tool that was set. Further, the estimated spindle torque graph display section 72 displays as a coordinate point B on the graph an estimated spindle torque with respect to the spindle speed.

[Configuration of Simulation Apparatus]

Figure 2:
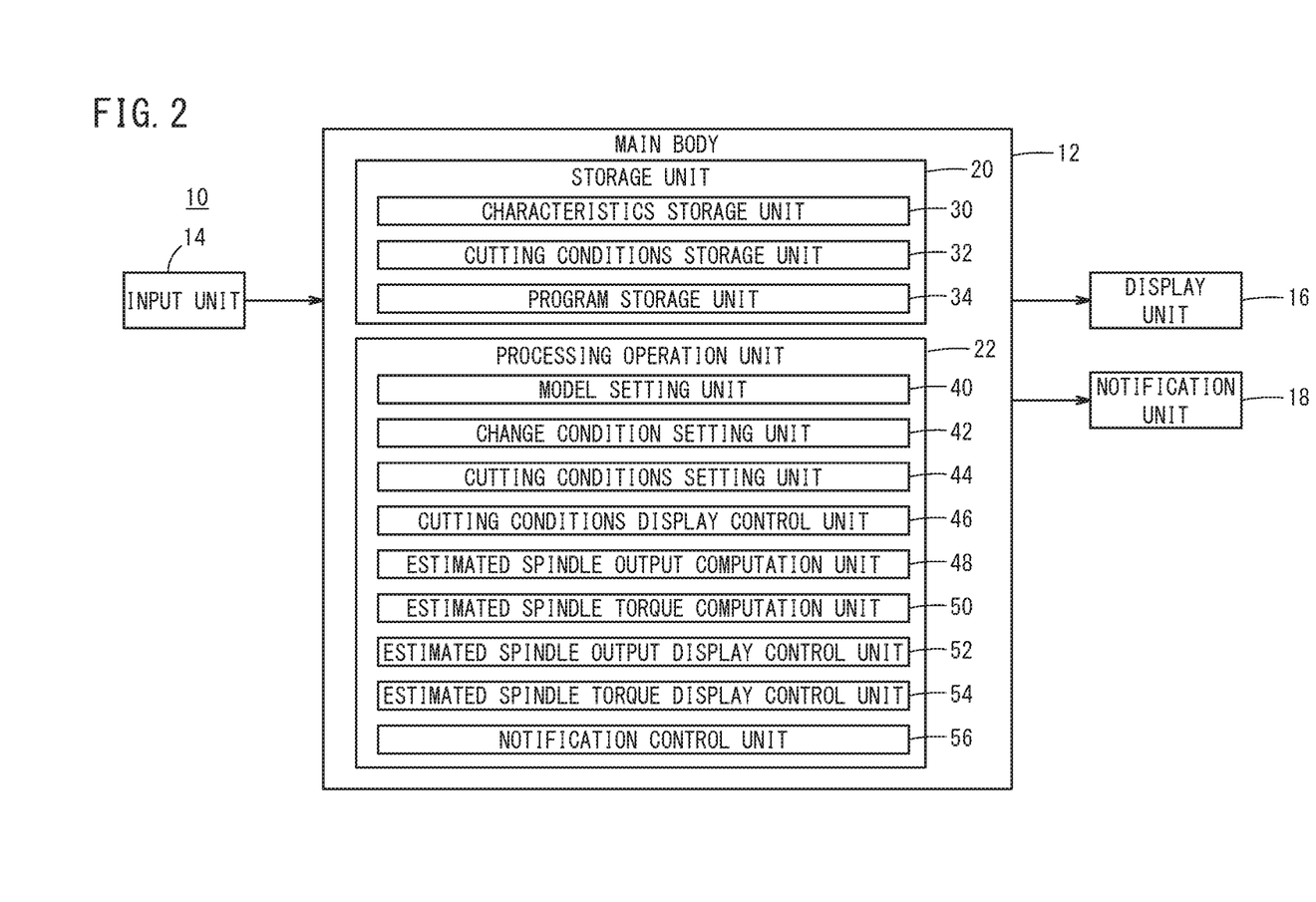
FIG. 2 is a block diagram showing a configuration of the simulation apparatus.

FIG. 2 is a block diagram showing the configuration of the simulation apparatus 10 according to the present embodiment. The simulation apparatus 10 is a personal computer or the like, and includes a main body 12, an input unit 14, the display unit 16, and a notification unit 18. The main body 12 includes a storage unit 20 and a processing operation unit 22. The storage unit 20 is a hard disk, a semiconductor memory, or the like, and stores various data, NC programs, and the like. The processing operation unit 22 is constituted from a processor, a memory, and the like, and performs various processes, calculations, and the like.

The input unit 14, for example, is a keyboard, a mouse, a touch panel, or the like. By an operator operating the input unit 14, it is possible to carry out inputting of characters, symbols, numbers, etc., designation of positions on the display unit 16, and selection of icons or the like displayed on the display unit 16. The display unit 16, for example, is a liquid crystal display or the like. Characters, symbols, numerals, images, and the like are capable of being displayed on the display unit 16. The notification unit 18 is a speaker or the like, and issues notifications to the operator by sound, voice or the like.

The storage unit 20 includes a characteristics storage unit 30, a cutting conditions storage unit 32, and a program storage unit 34. The characteristics storage unit 30 stores the rated output and the rated torque of the spindle with respect to spindle speed for each of models of the machine tool. The characteristics storage unit 30 stores a 1-minute rating and a continuous rating for each of the rated output and the rated torque. The cutting conditions storage unit 32 stores the set cutting conditions. The program storage unit 34 stores an NC program for operating the machine tool.

The processing operation unit 22 includes a model setting unit 40, a change condition setting unit 42, a cutting conditions setting unit 44, a cutting conditions display control unit 46, an estimated spindle output computation unit (spindle output estimating unit) 48, an estimated spindle torque computation unit (spindle output estimating unit) 50, an estimated spindle output display control unit (spindle output display control unit) 52, an estimated spindle torque display control unit 54 (spindle output display control unit), and a notification control unit 56.

Through operation of the input unit 14 by the operator, the model setting unit 40 sets the model name that is input in the model setting field 60 of the display unit 16, as the model of the machine tool. Through operation of the input unit 14 by the operator, the change condition setting unit 42 sets the condition that is input in the change condition setting field 62 of the display unit 16, as a condition to be changed.

Through operation of the input unit 14 by the operator, the cutting conditions setting unit 44 sets as cutting conditions the condition items that are input in the cutting conditions setting field 64 of the display unit 16. In addition to the method described above, there are three other setting methods for setting cutting conditions. The remaining three setting methods will be described in detail later. The cutting conditions set in the cutting conditions setting unit 44 are stored in the cutting conditions storage unit 32. The cutting conditions display control unit 46 outputs a command signal to the display unit 16 to thereby display in the cutting conditions setting field 64 the cutting conditions stored in the cutting conditions storage unit 32.

The estimated spindle output computation unit 48 calculates, on the basis of the cutting conditions stored in the cutting conditions storage unit 32, the spindle speed and the estimated spindle output of the set model of machine tool. The estimated spindle torque computation unit 50 calculates, on the basis of the cutting conditions stored in the cutting conditions storage unit 32, the spindle speed and the estimated spindle torque of the set model of machine tool.

The estimated spindle output display control unit 52 outputs a command signal to the display unit 16, and causes the estimated spindle output that was calculated to be displayed in the estimated spindle output display section 66 of the display unit 16. Further, the estimated spindle output display control unit 52 outputs a command signal to the display unit 16, and causes the rated output (1-minute rating, continuous rating) with respect to rotational speed of the spindle of the set model of machine tool stored in the characteristics storage unit 30 to be displayed in the form of a graph in the estimated spindle output graph display section 70 of the display unit 16. Furthermore, the estimated spindle output display control unit 52 outputs a command signal to the display unit 16, and causes the spindle speed and the estimated spindle output, which are calculated on the basis of the cutting conditions, to be displayed as the coordinate point A on the graph of the rated output.

The estimated spindle torque display control unit 54 outputs a command signal to the display unit 16, and causes the estimated spindle torque that was calculated to be displayed in the estimated spindle torque display section 68 of the display unit 16. Further, the estimated spindle torque display control unit 54 outputs a command signal to the display unit 16, and causes the rated torque (1-minute rating, continuous rating) with respect to rotational speed of the spindle of the set model of machine tool stored in the characteristics storage unit 30 to be displayed in the form of a graph in the estimated spindle torque graph display section 72 of the display unit 16. Furthermore, the estimated spindle torque display control unit 54 outputs a command signal to the display unit 16, and causes the spindle speed and the estimated spindle torque, which are calculated on the basis of the cutting conditions, to be displayed as the coordinate point B on the graph of the rated torque.

When the estimated spindle output is greater than or equal to the rated output, or the estimated spindle torque is greater than or equal to the rated torque, the notification control unit 56 outputs a command signal to the notification unit 18, to thereby cause the notification unit 18 to generate a sound and issue a notification to that effect with respect to the operator.

[Cutting Conditions Setting Method]

There are four setting methods for setting cutting conditions which are carried out in the cutting conditions setting unit 44. As described above, the first method is a method by which, through operation of the input unit 14 by the operator, the condition items that were input in the cutting conditions setting field 64 of the display unit 16 are set as cutting conditions.

The second method is a method to read in descriptions concerning the cutting conditions from the NC program that is stored in the program storage unit 34, and to set the descriptions as cutting conditions. In the NC program, there are commands for defining a feed amount, a feed rate, a spindle speed, etc., by combining alphabetical characters and numbers referred to as addresses. The cutting conditions setting unit 44 reads in such commands and sets them as cutting conditions. In the NC program, there may also be described as comments the type of cutting tool, the material of the workpiece, the finished diameter of the hole to be machined, the pilot hole diameter, and the like. The cutting conditions setting unit 44 reads in the descriptions concerning the cutting conditions from the comments in the NC program, and sets the descriptions as cutting conditions.

Moreover, in certain cases, it may be impossible to fill in all of the cutting condition items solely by the descriptions concerning the cutting conditions that are read in from the NC program. In this case, similar to the first method, the conditions of the items, which are input in the cutting conditions setting field 64 of the display unit 16 by operation of the input unit 14 by the operator, are set as cutting conditions.

In the third method, the cutting conditions are calculated and set from a coordinate point, which is designated on the graph of the estimated spindle output graph display section 70 or the estimated spindle torque graph display section 72 by an operation of the input unit 14 made by the operator (e.g., by an operation of clicking on the graph with a mouse).

In general, the estimated spindle output and the estimated spindle torque are calculated from a plurality of cutting conditions, and therefore, in order to calculate the cutting conditions from the coordinate point, concerning some of the items from among the cutting condition items, it is necessary that such cutting conditions be set by way of another method. A description will now be given of a specific example of the method of setting the cutting conditions from a coordinate point designated on the graph of the estimated spindle output graph display section 70.

For example, among the cutting condition items, concerning the items of the type of the cutting tool, the material of the workpiece, the finished diameter of the hole to be machined, the pilot hole diameter, and the Brinell hardness of the workpiece, similar to the above-described first method, the conditions of such items, which are input in the cutting conditions setting field 64 of the display unit 16 by operation of the input unit 14 by the operator, are set as cutting conditions by the cutting conditions setting unit 44. Next, the cutting conditions setting unit 44 reads in and sets the spindle speed from the coordinate point that was designated by the operator on the graph of the estimated spindle output graph display section 70.

Finally, the cutting conditions setting unit 44 reads in the spindle output from the coordinate point that was designated by the operator on the graph of the estimated spindle output graph display section 70, and then calculates and sets the cutting conditions of the item of the feed amount per one rotation of the spindle, so as to satisfy the cutting conditions of the already set items and the spindle output that was read in. Moreover, the method of setting the cutting conditions may be performed in substantially the same manner as described above, from a coordinate point specified on the graph of the estimated spindle torque graph display section 72.

The fourth method is a modified example of the third method, and is a method in which, in the case that the cutting conditions are to be changed, then in accordance with an operation of the input unit 14 made by the operator (for example, an operation of dragging the coordinate point with a mouse), the current coordinate point on the graph of the estimated spindle output graph display section 70 or the estimated spindle torque graph display section 72 is moved on the graph, and the cutting conditions are calculated and changed on the basis of the coordinate point after movement thereof.

When calculating the cutting conditions from the coordinate point, which has been moved on the graph of the estimated spindle output graph display section 70 or the estimated spindle torque graph display section 72, the cutting conditions setting unit 44 uses the change condition that was set in the change condition setting unit 42. The change condition is indicative of a condition for which a compromise is possible when the cutting conditions are changed, and more specifically, is a condition selected from among the surface quality of the machined surface, the dimensional accuracy after machining, and the machining time.

Figure 3:
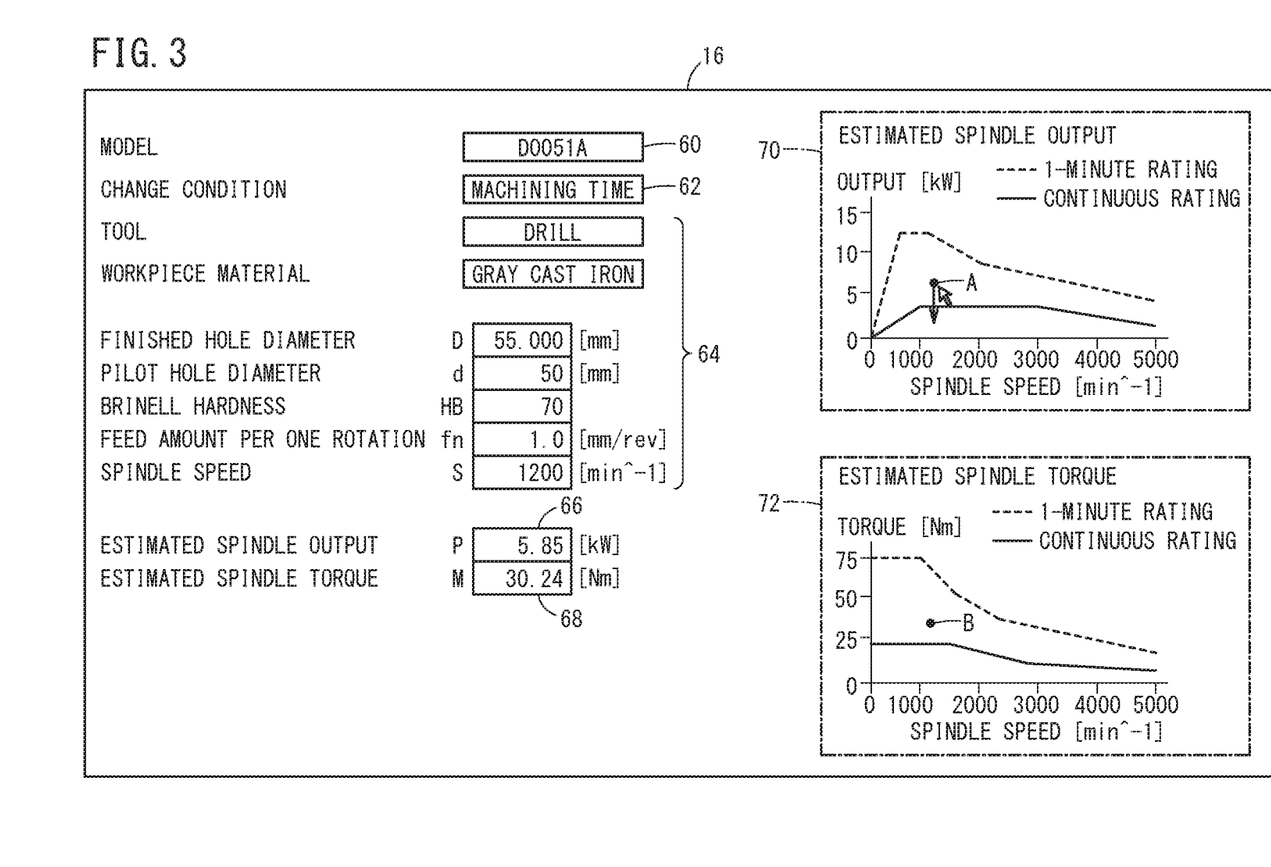
FIG. 3 is a diagram showing a display example of the display unit before cutting conditions are changed.

The act of changing the cutting conditions by moving the coordinate point on the graph will be described using a specific example. FIG. 3 is a diagram showing a display example of the display unit 16 before the cutting conditions are changed. The aforementioned FIG. 1 is a diagram showing a display example of the display unit 16 after the cutting conditions have been changed. For example, the machining time is set as the change condition. The coordinate point A on the graph of the estimated spindle output graph display section 70 is moved from the position (shown in FIG. 3) where the spindle speed is 1200 [min^−1] and the spindle output is 5.85 [kW] to the position (shown in FIG. 1) where the spindle speed is 1200 [min^−1] and the spindle output is 1.61 [kW]. In this case, prior to the change, the feed amount per one rotation was 1.0 [mm/rev] (see FIG. 3), however, after the change, the feed amount per one rotation becomes 0.2 [mm/rev] (see FIG. 1).

Moreover, the fourth method is capable of being used only in the case of changing cutting conditions that have already been set. However, the first method, the second method, and the third method can be used in the case of setting cutting conditions for the first time, or can also be used for changing the cutting conditions.

[Process Steps Executed in the Processing Operation Unit]

Figure 4:
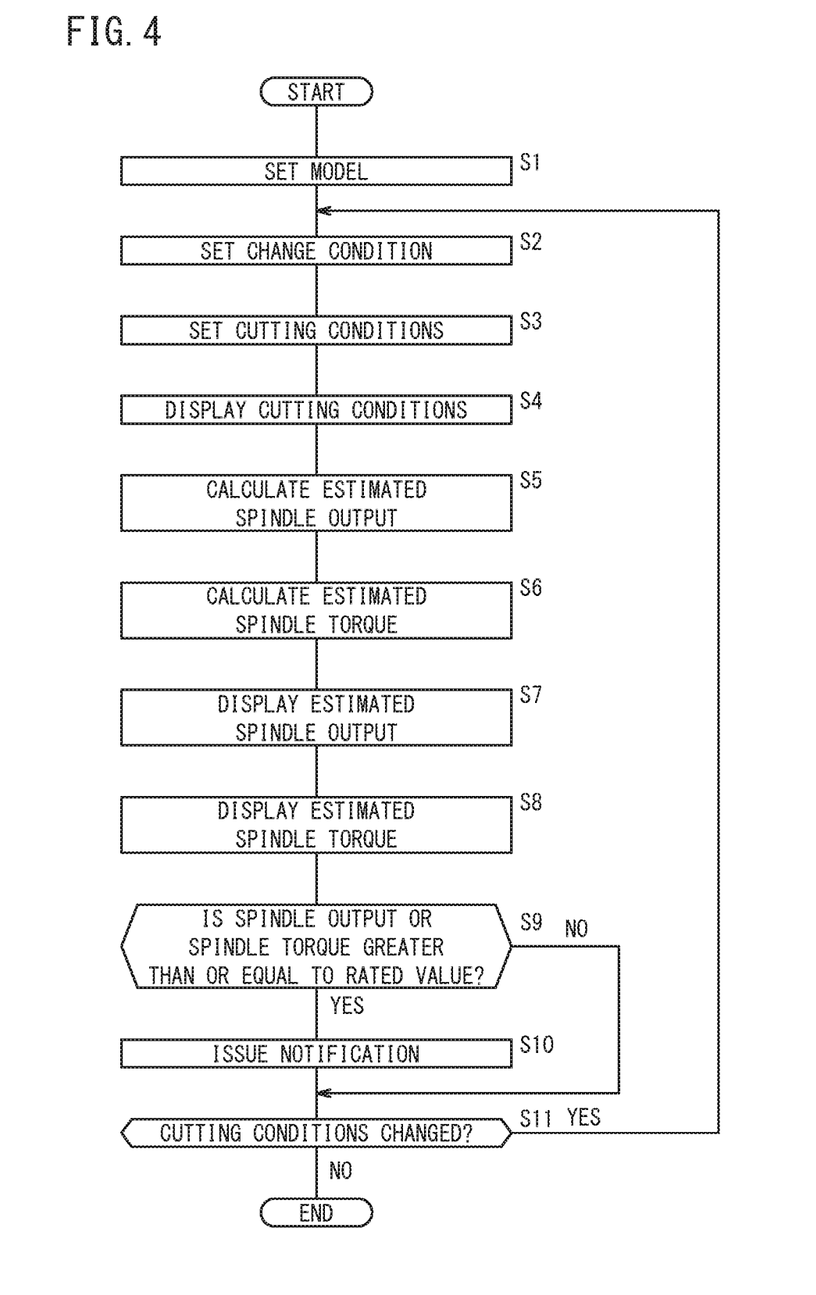
FIG. 4 is a flowchart showing the process flow of process steps executed in a processing operation unit.

FIG. 4 is a flowchart showing the process flow of process steps executed in the processing operation unit 22. In step S1, the model of the machine tool is set by the model setting unit 40, and then the process proceeds to step S2. In step S2, the change condition setting unit 42 sets the change condition, and then the process proceeds to step S3. In step S3, the cutting conditions setting unit 44 sets the cutting conditions, and then the process proceeds to step S4. Moreover, the set cutting conditions are stored in the cutting conditions storage unit 32.

In step S4, by operation of the cutting conditions display control unit 46, the cutting conditions of each of the items stored in the cutting conditions storage unit 32 are displayed in the cutting conditions setting field 64, and then the process proceeds to step S5. In step S5, by operation of the estimated spindle output computation unit 48, and on the basis of the cutting conditions stored in the cutting conditions storage unit 32, the spindle speed and the estimated spindle output of the set model of machine tool are calculated, and then the process proceeds to step S6. In step S6, by operation of the estimated spindle torque computation unit 50, and on the basis of the cutting conditions stored in the cutting conditions storage unit 32, the spindle speed and the estimated spindle torque of the set model of machine tool are calculated, and then the process proceeds to step S7.

In step S7, by operation of the estimated spindle output display control unit 52, information concerning the spindle output is displayed on the display unit 16, and then the process proceeds to step S8. The estimated spindle output display control unit 52 displays the estimated spindle output that was calculated, in the estimated spindle output display section 66. Further, the estimated spindle output display control unit 52 displays, in the form of a graph in the estimated spindle output graph display section 70, the rated output (1-minute rating, continuous rating) with respect to rotational speed of the spindle of the set model of machine tool stored in the characteristics storage unit 30. Furthermore, the estimated spindle output display control unit 52 displays, as the coordinate point A on the graph of the rated output, the spindle speed and the estimated spindle output, which are calculated on the basis of the cutting conditions.

In step S8, by operation of the estimated spindle torque display control unit 54, information concerning the spindle torque is displayed on the display unit 16, and then the process proceeds to step S9. The estimated spindle torque display control unit 54 displays the estimated spindle torque that was calculated, in the estimated spindle torque display section 68. Further, the estimated spindle torque display control unit 54 displays, in the form of a graph in the estimated spindle torque graph display section 72 of the display unit 16, the rated torque (1-minute rating, continuous rating) with respect to rotational speed of the spindle of the set model of machine tool stored in the characteristics storage unit 30. Furthermore, the estimated spindle torque display control unit 54 displays, as the coordinate point B on the graph of the rated torque, the spindle speed and the estimated spindle torque, which are calculated on the basis of the cutting conditions.

In step S9, the notification control unit 56 determines whether or not the estimated spindle output is greater than or equal to the rated output (continuous rating), or alternatively, whether the estimated spindle torque is greater than or equal to the rated torque (continuous rating). If the estimated spindle output is greater than or equal to the rated output (continuous rating), or the estimated spindle torque is greater than or equal to the rated torque (continuous rating), the process proceeds to step S10. If the estimated spindle output is less than the rated output (continuous rating), and the estimated spindle torque is less than the rated torque (continuous rating), the process proceeds to step S11.

In step S10, by operation of the notification control unit 56, a command signal is output to the notification unit 18 to thereby cause a sound or voice to be generated by the notification unit 18. Thus, a notification is issued to the operator to the effect that the estimated spindle output or the estimated spindle torque is greater than the rated output or the rated torque. Moreover, the notification control unit 56 may change the content of the notification issued by the notification unit 18, for the case in which the estimated spindle output or the estimated spindle torque is greater than or equal to the continuous rating, and for the case in which the estimated spindle output or the estimated spindle torque is greater than or equal to the 1-minute rating.

In step S11, the cutting conditions setting unit 44 determines whether or not the cutting conditions have been changed (input) by operation of the input unit 14 by the operator. If the cutting conditions have been changed, the process returns to step S2, whereas if the cutting conditions have not been changed, the process is brought to an end.

Operations and Effects

Heretofore, a device has existed in which the spindle output is estimated, and the estimated spindle output is displayed on a graph of a power diagram. However, since the cutting conditions used for estimating the spindle output are not displayed, an operator of such a device has been unable to confirm the cutting conditions that are set.

Thus, according to the simulation apparatus 10 of the present embodiment, cutting conditions of items are displayed in the cutting conditions setting field 64 of the display unit 16, and together therewith, graphs of the rated output and the rated torque (1-minute rating, continuous rating), as well as the estimated spindle output and the estimated spindle torque are displayed in the estimated spindle output graph display section 70 and the estimated spindle torque graph display section 72. Consequently, on the display unit 16, the operator is capable of confirming the relationship between the estimated spindle output, the estimated spindle torque and the respective rated values, together with confirming the cutting conditions that are currently set.

Further, since the graphs of the 1-minute rating and the continuous rating are displayed in the estimated spindle output graph display section 70 and the estimated spindle torque graph display section 72, the operator can carry out a confirmation as to whether the estimated spindle output and the estimated spindle torque are greater than or equal to the continuous rating, but are less than the 1-minute rating.

Further, in the cutting conditions setting unit 44, the descriptions concerning the cutting conditions are read in from the NC program, and are set as the cutting conditions. In accordance with this feature, regardless of the operations by the operator, it is possible to carry out setting of the cutting conditions automatically.

Further, in the cutting conditions setting unit 44, the cutting conditions are calculated and set on the basis of the coordinate point designated by the operator in the estimated spindle output graph display section 70 and the estimated spindle torque graph display section 72. Consequently, even without having a detailed understanding of the cutting conditions, the operator can set the cutting conditions appropriately.

Second Embodiment

Figure 5:
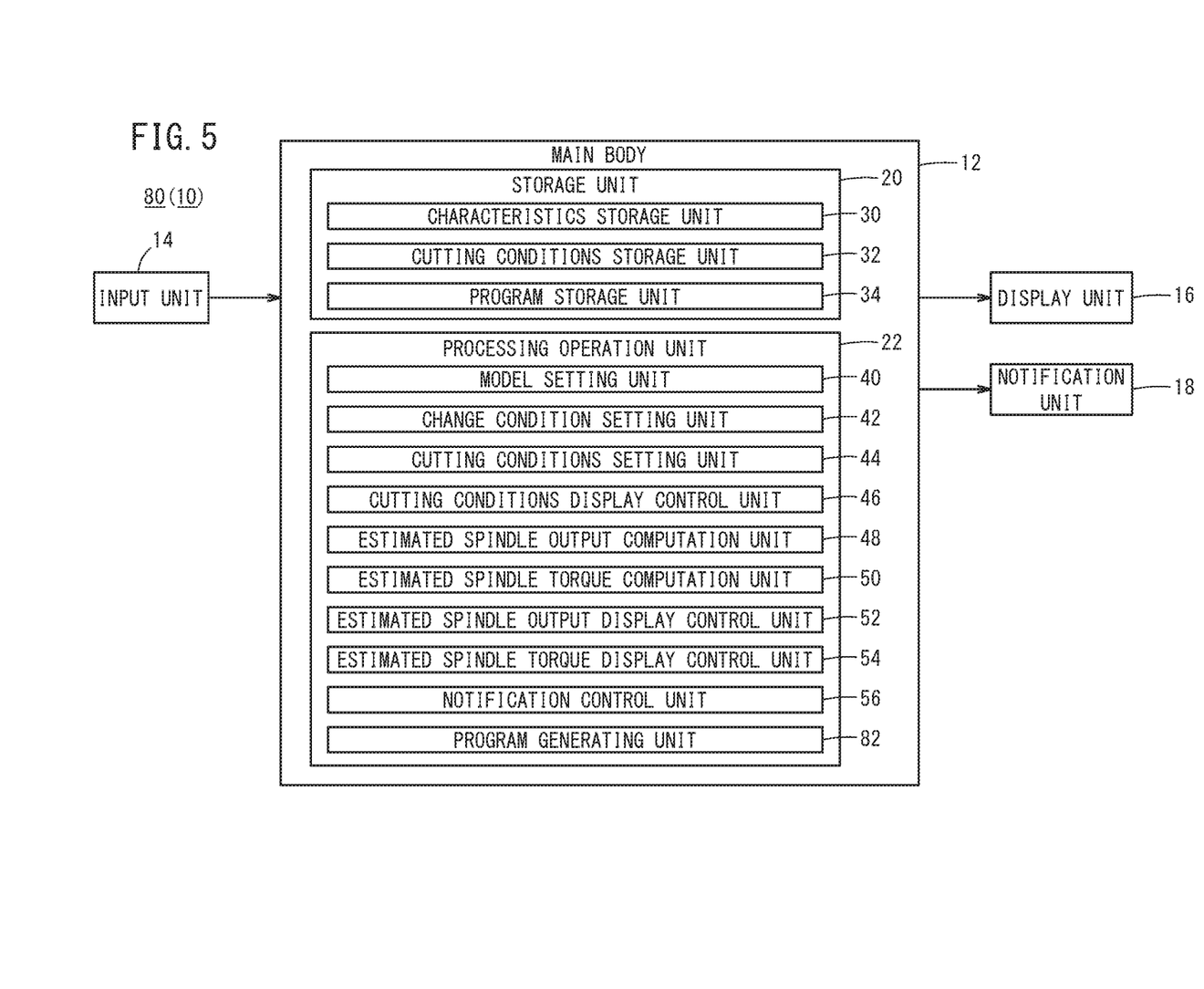
FIG. 5 is a block diagram showing a configuration of a program generating device.

According to a second embodiment, the simulation apparatus 10 of the first embodiment is applied to a program generating device 80 that generates an NC program for a machine tool. FIG. 5 is a block diagram showing a configuration of the program generating device 80 of the present embodiment. The program generating device 80 is a personal computer or the like, and includes, in addition to the constituent features of the simulation apparatus 10, a program generating unit 82 adapted to generate an NC program for the machine tool. The program generating unit 82 includes a CAD/CAM function, and generates the NC program based on a shape to be machined of the workpiece, which is input by the operator using the input unit 14. Upon generating the NC program, the program generating unit 82 writes descriptions concerning the cutting conditions of the NC program on the basis of the cutting conditions which are stored in the cutting conditions storage unit 32, and thereby generates the NC program.

[Operations and Effects]

The operator can easily set appropriate cutting conditions while observing the display on the display unit 16, and together therewith, without the operator directly creating the NC program, an NC program in which the set cutting conditions are reflected can be generated automatically.

Third Embodiment

Figure 6:
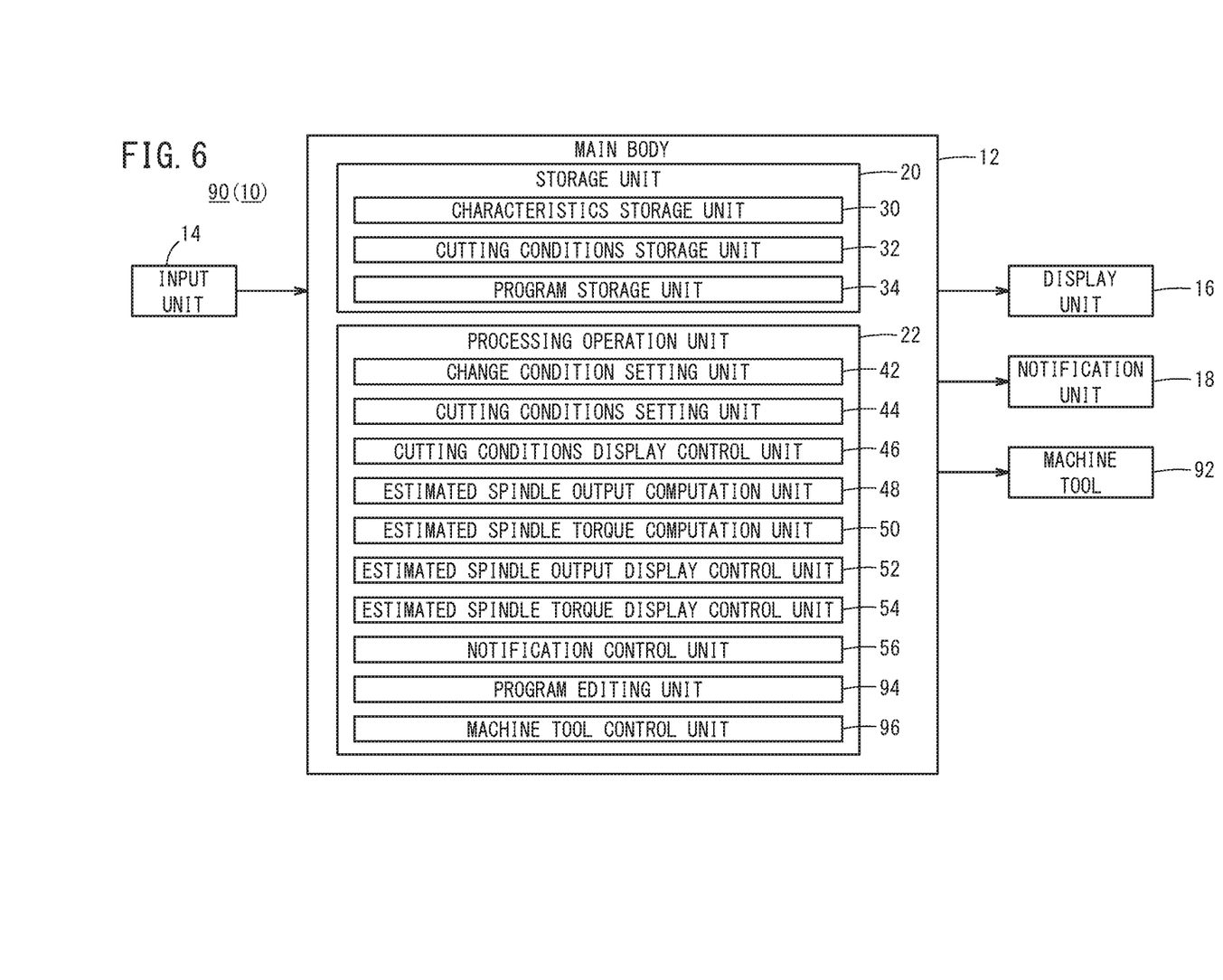
FIG. 6 is a block diagram showing a configuration of a controller.

According to a third embodiment, the simulation apparatus 10 of the first embodiment is applied to a controller 90 that controls the machine tool 92. FIG. 6 is a block diagram showing a configuration of the controller 90 of the present embodiment. The controller 90 is a computer or the like, and includes, in addition to the constituent features of the simulation apparatus 10, a program editing unit 94 adapted to edit the NC program that is stored in the program storage unit 34, and a machine tool control unit 96. On the basis of the cutting conditions that are stored in the cutting conditions storage unit 32, the program editing unit 94 edits the descriptions concerning the cutting conditions of the NC program which is stored in the program storage unit 34 for thereby editing the NC program. The machine tool control unit 96 controls the machine tool 92 based on the edited NC program. Further, the controller 90 is provided with respect to the one machine tool 92, and does not include the constituent feature of the model setting unit 40 of the simulation apparatus 10.

Furthermore, concerning the machine tool 92 on which the control is performed, the characteristics storage unit 30 stores the rated output and the rated torque of the spindle with respect to spindle speed.

Operations and Effects

The operator can easily set appropriate cutting conditions while observing the display on the display unit 16, and together therewith, without the operator directly editing the NC program, an NC program in which the set cutting conditions are reflected can be edited automatically.

Other Embodiments

While the present invention has been described with reference to particular embodiments, the technical scope of the present invention is not limited to the scope defined by the above embodiments. It goes without saying that various modifications or improvements are capable of being added to the above embodiments. It is clear from the scope of the claims that other modes to which such modifications or improvements have been added can be included within the technical scope of the present invention. For example, the notification unit 18 notifies the operator by way of sound or voice. However, in addition to sound, it is also possible to provide notifications by way of images, characters, light, vibrations, or the like.

[Technical Concept Obtained from the Embodiments]

The technical concept which can be grasped from the above-described embodiments will be described below.

The simulation apparatus (10) includes the characteristics storage unit (30) that stores a rated value of a value related to output of a spindle of a machine tool depending on a rotational speed of the spindle, the cutting conditions storage unit (32) that stores cutting conditions for cutting the workpiece, the spindle output estimating unit (48, 50) that estimates, on the basis of the stored cutting conditions, the rotational speed of the spindle, and the value related to the output of the spindle at the time of cutting the workpiece, the cutting conditions display control unit (46) that displays the stored cutting conditions on the display unit (16), and the spindle output display control unit (52, 54) that displays on the display unit (16) a graph showing the rated value with respect to the rotational speed of the spindle, and also displays on the display unit (16), as a coordinate point on the graph, the value related to the output with respect to the rotational speed of the spindle which is estimated from the cutting conditions. Consequently, on the display unit (16), the operator is capable of confirming the relationship between the rated value and the estimated value related to output of the spindle, together with confirming the cutting conditions that are set, and therefore, appropriate cutting conditions can easily be set.

The above-described simulation apparatus (10) may further include the cutting conditions setting unit (44) that sets conditions specified by an operation of the input unit (14) by the operator, as cutting conditions, wherein the cutting conditions storage unit (32) stores the set cutting conditions. In accordance with this feature, arbitrary cutting conditions can be set by the operator.

The above-described simulation apparatus (10) may further include the program storage unit (34) that stores the machining program for the machine tool, wherein the cutting conditions setting unit (44) may read in and set the cutting conditions from the stored machining program. Consequently, without the operator inputting the cutting conditions, the cutting conditions can be set automatically from the machining program.

In the above-described simulation apparatus (10), the cutting conditions setting unit (44) may calculate the cutting conditions from coordinates on the graph designated by an operation of the input unit (14) by the operator, and the set cutting conditions may be changed to the calculated cutting conditions. Consequently, even without having a detailed understanding of the cutting conditions, the operator is capable of changing the cutting conditions appropriately.

The above-described simulation apparatus (10) may further include the notification control unit (56) which issues a notification from the notification unit (18), when the estimated value related to the output of the spindle is greater than or equal to the rated value. In accordance with this feature, the operator can reliably recognize that, with the currently set cutting conditions, the value related to the output of the spindle at the time of machining is greater than or equal to the rated value, and thus there is a concern that normal machining cannot be performed.

In the above-described simulation apparatus (10), the value related to the output of the spindle may be an output of the spindle. In accordance with this feature, it is possible to estimate the output of the spindle in accordance with the set cutting conditions.

In the above-described simulation apparatus (10), the value related to the output of the spindle may be a torque of the spindle. In accordance with this feature, it is possible to estimate the torque of the spindle in accordance with the set cutting conditions.

In the above-described simulation apparatus (10), the value related to the output of the spindle may be an output and a torque of the spindle. In accordance with this feature, it is possible to estimate the output and the torque of the spindle in accordance with the set cutting conditions.

The above-described simulation apparatus (10) may further include the model setting unit (40) that sets a model of the machine tool, wherein the characteristics storage unit (30) may store rated values for each of the models of the machine tool, the spindle output estimating unit (48, 50) may calculate the rotational speed of the spindle, and the value related to the output of the spindle at the time of cutting the workpiece, from the set model, and the cutting conditions stored in the cutting conditions storage unit (32), and the spindle output display control unit (52, 54) may display on the display unit (16) a graph showing the rated value of the set model with respect to the rotational speed of the spindle, and also display on the display unit (16), as a coordinate point on the graph, the value related to the output with respect to the rotational speed of the spindle which is calculated from the set model and the cutting conditions. In accordance with this feature, the value concerning the output can be estimated with respect to a plurality of different models of machine tools, and can be displayed as the coordinate point on the graph, on the display unit (16).

The program generating device (80) includes the above-described simulation apparatus (10), and generates the machining program for the machine tool, the program generating device (80) including the program generating unit (82) which generates the machining program for the machine tool in accordance with the cutting conditions stored in the cutting conditions storage unit (32). Consequently, the operator can easily set appropriate cutting conditions, and together therewith, without the operator directly creating the NC program, an NC program in which the set cutting conditions are reflected can be generated automatically.

The controller (90) includes the above-described simulation apparatus (10), and controls the machine tool (92), the controller (90) including the program storage unit (34) that stores a machining program for the machine tool (92), the program editing unit (94) that edits the stored machining program in accordance with the cutting conditions stored in the cutting conditions storage unit (32), and the machine tool control unit (96) that controls the machine tool in accordance with the edited machining program.

Consequently, the operator can easily set appropriate cutting conditions, and together therewith, without the operator editing the NC program directly, an NC program in which the set cutting conditions are reflected can be edited automatically.

In the display method for the computer, the computer (10, 80, 90) includes the characteristics storage unit (30) that stores a rated value of a value related to output of a spindle of a machine tool depending on a rotational speed of the spindle, the cutting conditions storage unit (32) that stores the cutting conditions for cutting the workpiece, and the display unit (16) that displays the cutting conditions, and the rated value of the value related to output of the spindle. The display method for the computer includes the steps of estimating on the basis of the stored cutting conditions the rotational speed of the spindle, and the value related to the output of the spindle at the time of cutting the workpiece, displaying the stored cutting conditions on the display unit (16), and displaying on the display unit (16) a graph showing the rated value with respect to the rotational speed of the spindle, together with displaying on the display unit (16), as a coordinate point on the graph, the value related to the output with respect to the rotational speed of the spindle which is estimated from the cutting conditions. Consequently, on the display unit (16), the operator is capable of confirming the relationship between the rated value and the estimated value related to output of the spindle, together with confirming the cutting conditions that are set, and therefore, appropriate cutting conditions can easily be set.

In the above-described display method for the computer (10, 80, 90), conditions specified by an operation of the input unit (14) by the operator are stored as the cutting conditions in the cutting conditions storage unit (32). In accordance with this feature, arbitrary cutting conditions can be set by the operator.

In the above-described display method for the computer (10, 80, 90), the cutting conditions are calculated from coordinates on the graph which are designated by an operation of the input unit (14) by the operator. Consequently, even without having a detailed understanding of the cutting conditions, the operator can set the cutting conditions appropriately.

In the above-described display method for the computer (10, 80, 90), the computer (10) may further include the program storage unit (34) that stores the machining program for the machine tool, and the cutting conditions may be read in and set from the stored machining program. Consequently, without the operator inputting the cutting conditions, the cutting conditions can be set automatically from the machining program.

What is claimed is:
1. A simulation apparatus comprising:
a characteristics storage unit configured to store a rated value of a value related to output of a spindle of a machine tool depending on a rotational speed of the spindle;
a cutting conditions storage unit configured to store cutting conditions for cutting a workpiece;
a spindle output estimating unit configured to estimate, on basis of the stored cutting conditions, the rotational speed of the spindle, and the value related to the output of the spindle at a time of cutting the workpiece;
a cutting conditions display control unit configured to display the stored cutting conditions on a display unit;

a spindle output display control unit configured to display on the display unit a graph showing the rated value with respect to the rotational speed of the spindle, and also display on the display unit, as a coordinate point on the graph, the value related to the output with respect to the rotational speed of the spindle which is estimated from the cutting conditions; and a cutting conditions setting unit configured to set conditions specified by an operation of an input unit by an operator, as the cutting conditions;

wherein the cutting conditions storage unit stores the set cutting conditions, and wherein the cutting conditions setting unit calculates the cutting conditions from coordinates on the graph designated by an operation of the input unit by the operator, and changes the set cutting conditions to the calculated cutting conditions.

2. The simulation apparatus according to claim 1, further comprising a program storage unit configured to store a machining program for the machine tool;

wherein the cutting conditions setting unit reads in and sets the cutting conditions from the stored machining program.

3. The simulation apparatus according to claim 1, further comprising a notification control unit configured to issue a notification from a notification unit, when the estimated value related to the output of the spindle is greater than or equal to the rated value.

4. The simulation apparatus according to claim 1, wherein the value related to the output of the spindle is an output of the spindle.

5. The simulation apparatus according to claim 1, wherein the value related to the output of the spindle is a torque of the spindle.

6. The simulation apparatus according to claim 1, wherein the value related to the output of the spindle is an output and a torque of the spindle.

7. The simulation apparatus according to claim 1, further comprising:

a model setting unit configured to set a model of the machine tool;

wherein the characteristics storage unit stores the rated value for each model of the machine tool;

the spindle output estimating unit calculates the rotational speed of the spindle, and the value related to the output of the spindle at the time of cutting the workpiece, from the set model, and the cutting conditions stored in the cutting conditions storage unit; and the spindle output display control unit displays on the display unit a graph showing the rated value of the set model with respect to the rotational speed of the spindle, and also displays on the display unit, as a coordinate point on the graph, the value related to the output with respect to the rotational speed of the spindle which is calculated from the set model and the cutting conditions.

8. A program generating device including the simulation apparatus according to claim 1, and configured to generate a machining program for the machine tool, the program generating device comprising:

a program generating unit configured to generate the machining program for the machine tool in accordance with the cutting conditions stored in the cutting conditions storage unit.

9. A controller including the simulation apparatus according to claim 1, and configured to control the machine tool, the controller comprising:

a program storage unit configured to store a machining program for the machine tool;

a program editing unit configured to edit the stored machining program in accordance with the cutting conditions stored in the cutting conditions storage unit; and a machine tool control unit configured to control the machine tool in accordance with the edited machining program.

10. A display method for a computer, the computer including:

a characteristics storage unit configured to store a rated value of a value related to output of a spindle of a machine tool depending on a rotational speed of the spindle;

a cutting conditions storage unit configured to store cutting conditions for cutting a workpiece; and a display unit configured to display the cutting conditions, and the rated value of the value related to the output of the spindle;

the display method for the computer comprising the steps of:

calculating the cutting conditions from coordinates on the graph which are designated by an operation of the input unit by the operator;

storing conditions specified by an operation of an input unit by an operator as the cutting conditions in the cutting conditions storage unit;

estimating, on basis of the stored cutting conditions, the rotational speed of the spindle, and the value related to the output of the spindle at a time of cutting the workpiece;

displaying the stored cutting conditions on the display unit; and displaying on the display unit a graph showing the rated value with respect to the rotational speed of the spindle, and displaying on the display unit, as a coordinate point on the graph, the value related to the output with respect to the rotational speed of the spindle which is estimated from the cutting conditions.

11. The display method for the computer according to claim 10, wherein:

the computer further includes a program storage unit configured to store a machining program for the machine tool; and the cutting conditions are read in from the stored machining program, and are stored in the cutting conditions storage unit.

* * * * *